United States Patent [19]

Hanley et al.

[11] Patent Number: 5,525,949
[45] Date of Patent: Jun. 11, 1996

[54] ENERGY STORAGE DEVICE

[75] Inventors: Peter Hanley, Forest of Dean; Ian L. McDougall, Charlbury, both of England

[73] Assignee: Oxford Instruments (UK) Ltd., Witney, United Kingdom

[21] Appl. No.: 157,054

[22] PCT Filed: Jun. 18, 1992

[86] PCT No.: PCT/GB92/01095

§ 371 Date: Feb. 4, 1994

§ 102(e) Date: Feb. 4, 1994

[87] PCT Pub. No.: WO92/22914

PCT Pub. Date: Dec. 23, 1992

[30] Foreign Application Priority Data

Jun. 19, 1991 [GB] United Kingdom ............ 9113223

[51] Int. Cl.$^6$ .................. H01F 1/00; H01F 5/00; H01F 36/00; H01F 6/00
[52] U.S. Cl. .................. 335/216; 335/299; 336/DIG. 1; 323/360; 505/211; 505/879; 505/880
[58] Field of Search .................. 335/216; 336/DIG. 1; 505/1, 705, 879; 323/360

[56] References Cited

U.S. PATENT DOCUMENTS

| | | | |
|---|---|---|---|
| 4,528,609 | 7/1985 | Purcell | 361/19 |
| 4,920,095 | 4/1990 | Ishigaki | 505/1 |
| 4,939,444 | 7/1990 | Cacheux | 323/360 |
| 4,985,679 | 1/1991 | McDougall | 324/318 |
| 5,008,624 | 4/1991 | Yoshida . | |
| 5,011,820 | 4/1991 | Ehrhart et al. . | |
| 5,130,687 | 7/1992 | Evrard | 335/216 |
| 5,146,383 | 9/1992 | Logan | 361/19 |
| 5,237,300 | 8/1993 | Ige | 335/299 |
| 5,256,993 | 10/1993 | Walter | 335/216 |

FOREIGN PATENT DOCUMENTS

| | | | |
|---|---|---|---|
| 0325313 | 7/1989 | European Pat. Off. . | |
| 4027546 | 1/1992 | Germany . | |
| 63-260113 | 10/1988 | Japan | 335/216 |
| 63-277437 | 11/1988 | Japan . | |
| 1-96907 | 4/1989 | Japan | 335/216 |
| 2-186607 | 7/1990 | Japan | 335/216 |
| 2-206102 | 8/1990 | Japan | 335/216 |
| 89/05033 | 6/1989 | WIPO . | |

Primary Examiner—Leo P. Picard
Assistant Examiner—Stephen T. Ryan
Attorney, Agent, or Firm—Staas & Halsey

[57] ABSTRACT

An energy storage device comprising an array of electrical coils formed from relatively high temperature superconducting material, the coils being arranged around a common axis and carrying working currents in the same sense.

6 Claims, 3 Drawing Sheets

ENERGY STORAGE DEVICE

The invention relates to an energy storage device.

It is well known to provide an energy storage device in the form of an electrical coil as is described, for example, in JP-A-52-90293. Typically, such storage devices are made from superconducting wire so as to maximise the storage capacity. However, in order to achieve a large storage capacity, large devices have to be constructed with the associated problems of manufacture and maintenance and cost. Another example is described in U.S. Pat. No. 4,920,095.

It is well known that it is possible to synthesise a large magnet from a number of smaller elements. In this connection a tesselated structure of ceramic tiles is described in WO-A-89/03581. This structure is not suitable for use as an energy storage device, for example because of the need to use slab like geometries and because such tiles would tend to minimise inductance by adjusting the current path within a tile so as to minimise the threading of the current loop by magnetic flux.

In accordance with the present invention, an energy storage device comprises an array of electrical coils formed from relatively high temperature superconducting material, the axes of the coils being spaced apart and arranged around a common axis, and the coils being connected to an electrical power supply, and carrying working currents in the same sense with respect to the common axis.

We have found that it is possible to construct a practical energy storage device utilising relatively high temperature superconducting materials and achieve higher energy densities than is possible with a conventional single coil of the same dimensions with the further, surprising advantage, that the stresses involved in the array are less than in a single coil.

The use of an array of electrical coils enables these coils to be fabricated relatively easily from relatively lengths of conductor are needed. Preferably, the coils are small having radii up to about 10 cm. A particular advantage of small coils is that they will be less likely to suffer damage due to thermal strain, which usually "adds up" and causes local discontinuities. With a brittle material this is particularly important, as a large diameter track has a greater probability of generating a local fault. Further advantages include simplification of the support of the electromagnetic forces; the ability to connect the individual coils in various series/parallel arrangements allowing the possibility of flexibility and matching to different load requirements and individual control; and permitting different types of quench protection techniques to be developed which has hitherto not been achieved for large relatively high temperature superconducting devices.

By "relatively high temperature" we refer to superconducting materials which do not have robecooled to liquid helium temperatures. Typically, such materials superconduct at least at liquid nitrogen temperatures (77K). Examples are certain ceramics and oxides, for example as disclosed in EP-A-0298461.

In one example, the coils are arranged in an hexagonal array and typically a central coil is also provided.

Some examples of energy storage devices according to the invention will now be described with reference to the accompanying drawings, in which.

Figure 1:
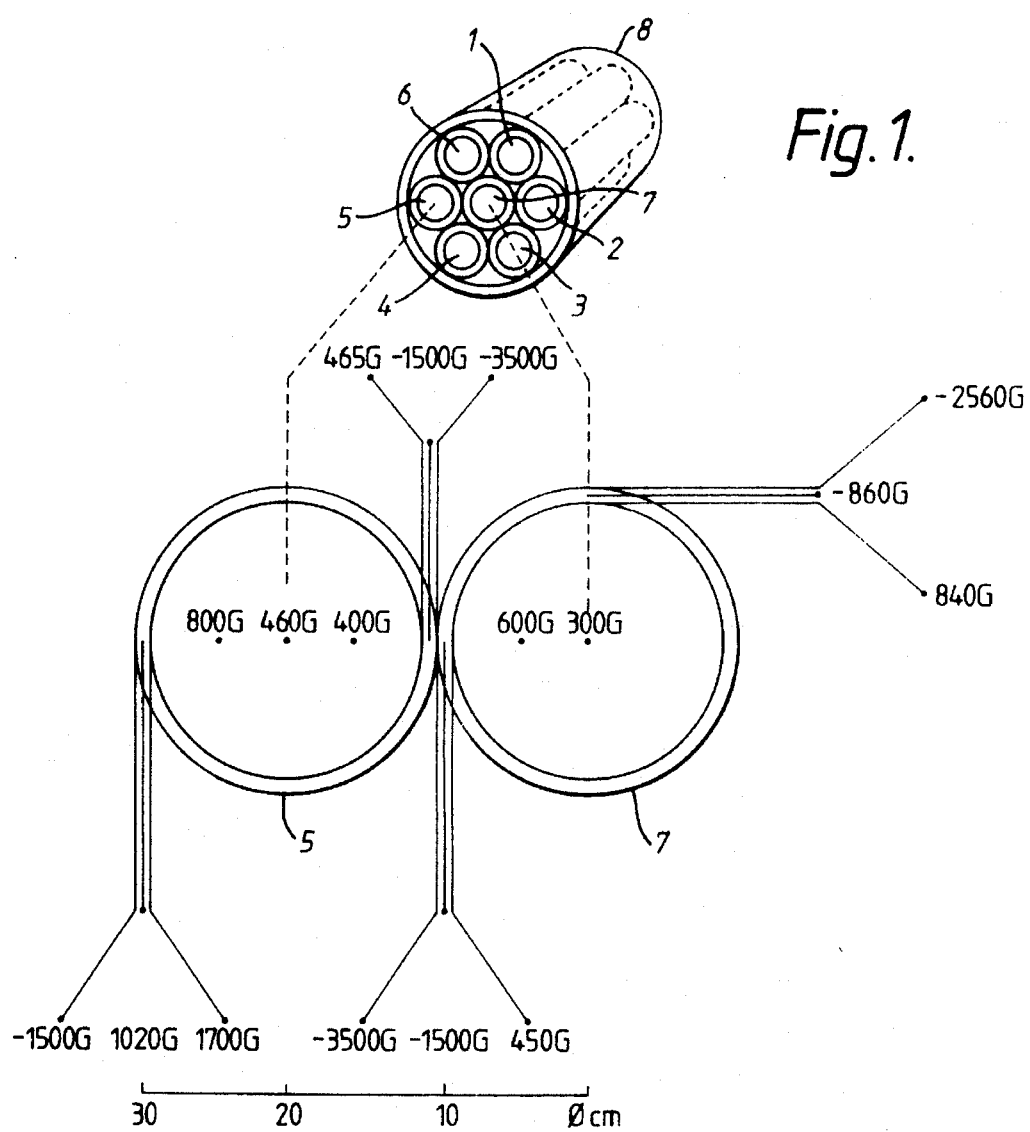
FIG. 1 is a schematic, perspective view of one example.
Figure 2:
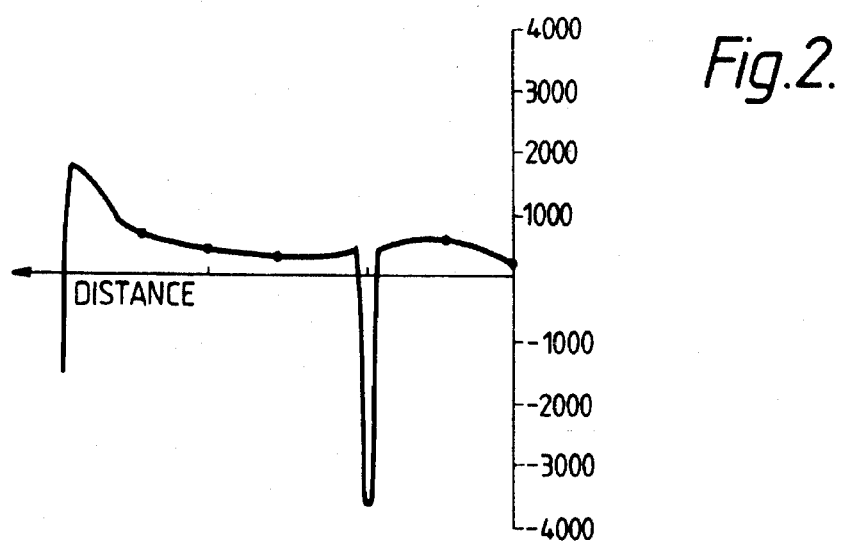
FIG. 2 illustrates the variation in field strength in the radial direction of the example shown in FIG. 1.

The energy storage device shown in FIG. 1 comprises an array of six outer small electrical coils 1–6 made from HTc superconducting wire. The coils 1–6 are mounted around a small central coil 7 of a similar type, all the coils being housed with a former 8 shown schematically in FIG. 1. Each coil 1–7 is formed of 1000 amp-turns, has an outer radius of 10 cm, an inner radius of 9 cm and a length of 2 cm. Each is connected in parallel to a back plane supply (not shown) which provides useful redundancy in the event of failure of one of the coils. FIG. 1 shows in enlarged form the variation of magnetic field strength around the coils 5,7. FIG. 2 illustrates the variation in field strength in a radial direction from the centre of the coil 7 through the coil 5.

In order to investigate the invention, we have modelled on a computer an hexagonal array of current hoops and have calculated fields and flux and hence inductance. For this model, we assumed that the most convenient shape of elementary coil is circular and that these are arranged in a close-packed hexagonal planar array. We modelled the system by an array of hoops of radius r separated from their nearest neighbours by the "lattice constant" a, such that a $\geq$ 2 r. Such a system has six-fold symmetry, and the model allows increasingly distant neighbouring coils to be added in groups of six. To simulate the behaviour near the edge of the system neighbours can be confined to a sector of typically 180°.

Figure 3:
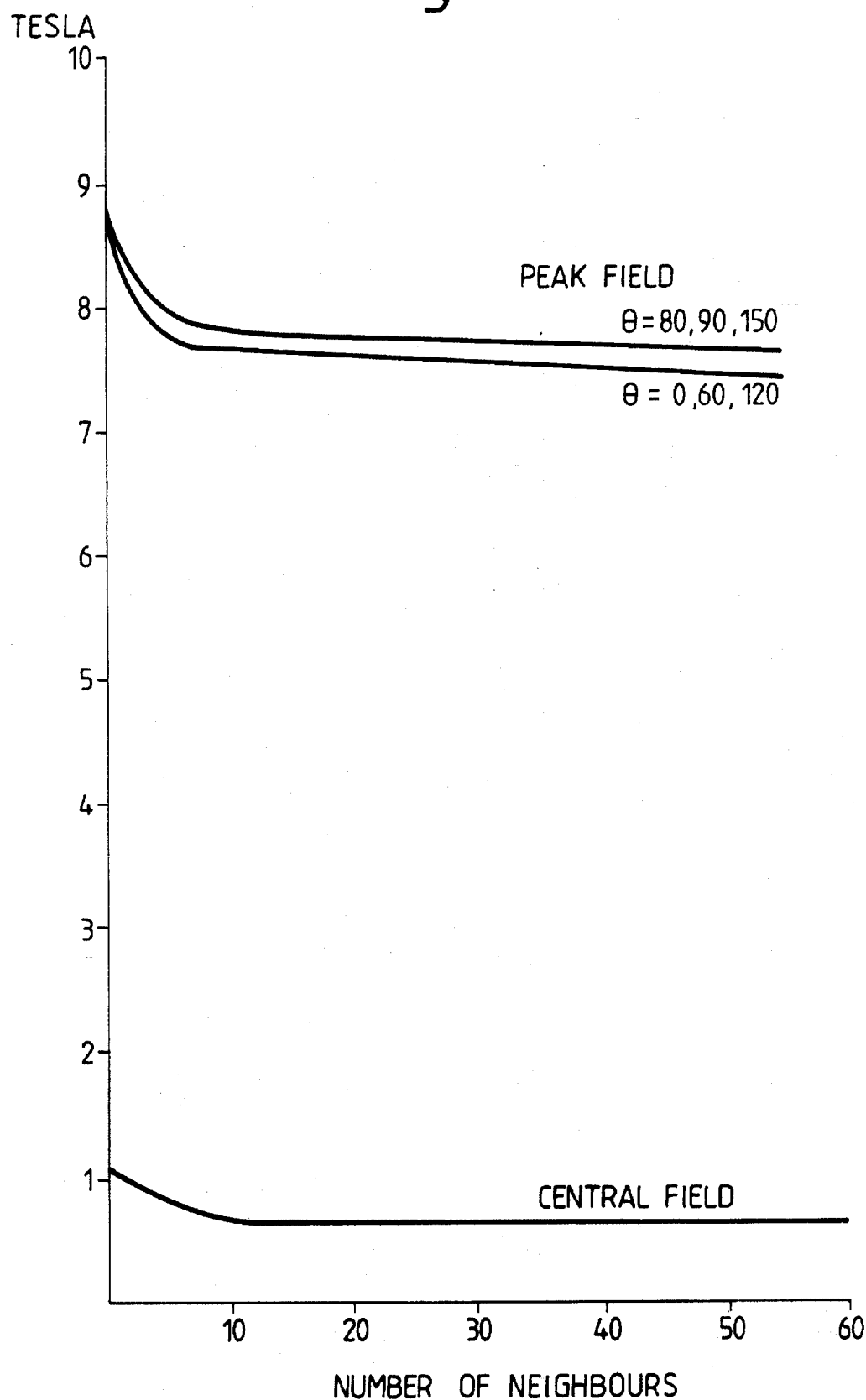
FIG. 3 illustrates the variation in peak field and central field in connection with a mathematical analysis based on current hoops; and, FIG. 4 illustrates the manner in which peak field varies around the circumference of a coil at the edge of the array.

As an example, current hoops each of $10^5$ ampere-turns and of diameter 52.6 mm, separated by 60 mm between centres were used in the model. FIG. 3 shows how the central field and the peak field at 50 mm radius decrease as the number of neighbours used in the calculation is increased. Obviously a coil of appreciable length would have a less extreme ratio of central to peak field, but the hoop model serves to illustrate the point.

Figure 4:
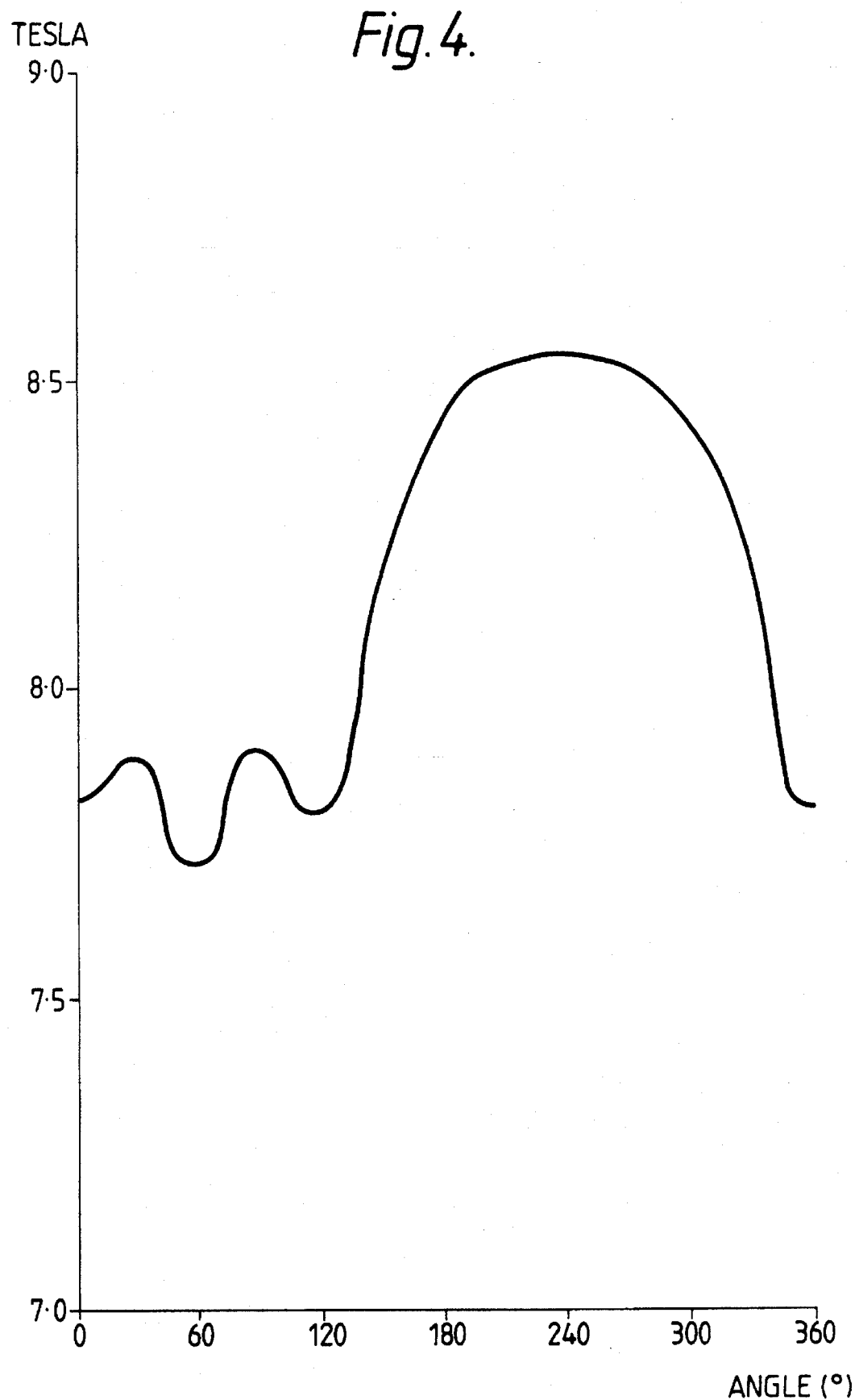

At the edge of the array, the effect of the neighbours becomes less and FIG. 4 plots the way the peak field varies around the circumference of a coil at the edge of the array.

In order to arrive at the inductance, the flux through the elementary coils was calculated by numerical integration. To avoid the singularity at the radius of the hoop, the integration extended to 95% of the radius only.

Taking the current as 100A and the number of turns as 1000, the inductance of the general elementary coil is 37.6 μH and of an edge coil 119.5 μH.

The area occupied by the "unit cell" is 0.866 $a^2$=1.25× $10^{-2}m^2$. 100 such elements would occupy 1.25 $m^2$ an area with a radius of 0.63 m. The array would consist of 28 edge coils and 72 internal coils giving a total inductance of 6 mH.

The hoop stress in the conductor, assuming a current density of 100A/$mm^2$ is 4.2×$10^7$N/$m^2$ which is entirely acceptable with no additional supporting material.

For comparison, the same calculations were performed on a single hoop of $10^5$ ampere-turns and radius 0.63 m. This has much lower peak and central fields (0.75 T and 0.2 T) and an inductance of 2.4 mH. At the same current density, the hoop stress is 4.7 $10^7$N/$m^2$.

The implication of this is that with an array of small coils it is possible to achieve a higher energy density (a larger volume of space is close to the windings) while keeping stresses to an acceptably low level. Such a technique therefore enables the high-field performance of HTSC to be exploited for energy storage. The cost of this is, of course, the greater quantity of conductor needed. However this disadvantage may be offset by the conductors being easier to fabricate, simpler to protect, and self-supporting.

We claim:

1. An energy storage device comprising an array of electrical coils formed from material which superconducts above the temperature of liquid helium, the axes of adjacent coils being laterally spaced apart and arranged around a common axis such that the cross-sections of the coils do not overlap, and the coils being connected to an electrical power supply, and carrying working currents in the same sense with respect to the common axis, said array including a central coil, and wherein each coil is formed from a set of windings, the radial dimension of the windings of each coil being small relative to the radius of the coil.

2. A device according to claim 1, wherein the axes of the coils are arranged in a hexagonal array.

3. A device according to claim 1, wherein the coils have radii less than or equal to 10 cm.

4. A device according to claim 1, wherein the coils are connected in parallel to a power supply.

5. a device according to claim 1, wherein the radial dimension of the windings of each coil is less than 50% of the radius of the coil.

6. A device according to claim 5, wherein the radial dimension of the windings of each coil is about 10% of the radius of the coil.

* * * * *